(12) United States Patent
Beuchelt

(10) Patent No.: US 12,288,658 B2
(45) Date of Patent: Apr. 29, 2025

(54) SWITCHING DEVICE AND VOLTAGE LIMITING DEVICE HAVING A SWITCHING DEVICE

(71) Applicant: Rail Power Systems GmbH, Munich (DE)

(72) Inventor: Julian Beuchelt, Eppstein (DE)

(73) Assignee: Rail Power Systems GmbH, Munich (DE)

( * ) Notice: Subject to any disclaimer, the term of this patent is extended or adjusted under 35 U.S.C. 154(b) by 365 days.

(21) Appl. No.: 17/625,299

(22) PCT Filed: Jul. 17, 2020

(86) PCT No.: PCT/EP2020/070378
§ 371 (c)(1),
(2) Date: Jan. 6, 2022

(87) PCT Pub. No.: WO2021/013763
PCT Pub. Date: Jan. 28, 2021

(65) Prior Publication Data
US 2022/0148837 A1    May 12, 2022

(30) Foreign Application Priority Data
Jul. 25, 2019  (EP) .................................. 19188414

(51) Int. Cl.
*H01H 71/08*   (2006.01)
*B60M 5/02*    (2006.01)
*H01H 1/14*    (2006.01)

(52) U.S. Cl.
CPC .............. *H01H 71/08* (2013.01); *B60M 5/02* (2013.01); *H01H 1/14* (2013.01)

(58) Field of Classification Search
CPC ....... H01H 2001/2091; H01H 2001/22; H01H 2001/54; H01H 2001/545; H01H 2001/58;
(Continued)

(56) References Cited

U.S. PATENT DOCUMENTS 3,171,920 A * 3/1965 Klein ..................... H01H 3/264
                                                     335/71
4,467,301 A    8/1984 Goodrich
(Continued)

FOREIGN PATENT DOCUMENTS

DE    102008049706 A1    4/2010
EP       1901320 A1      3/2008
(Continued)

OTHER PUBLICATIONS

International Preliminary Report on Patentability from the corresponding PCT application No. PCT/EP2020/070378, dated Jan. 25, 2022, 8 pages (not prior art).
International Search Report from the corresponding PCT application No. PCT/EP2020/070378.
Co pending U.S. Appl. No. 17/625,303 (not prior art).
(Continued)

*Primary Examiner* — Anthony R Jimenez
(74) *Attorney, Agent, or Firm* — Lucian Wayne Beavers; Patterson Intellectual Property Law, PC

(57) ABSTRACT

A switching device includes first and second fixed switching contacts and a movable switching contact. The first and second fixed switching contacts are connected to first and second device terminals and are arranged next to one another in such a way that their contact surfaces point in the same direction. The movable switching contact can be moved between a closed position and an open position. The first and second fixed switching contacts and the movable switching contact form an arrangement of electrical conductors which are arranged substantially parallel to one another. At least one of the fixed switching contacts has an elongated
(Continued)

Figure 1:
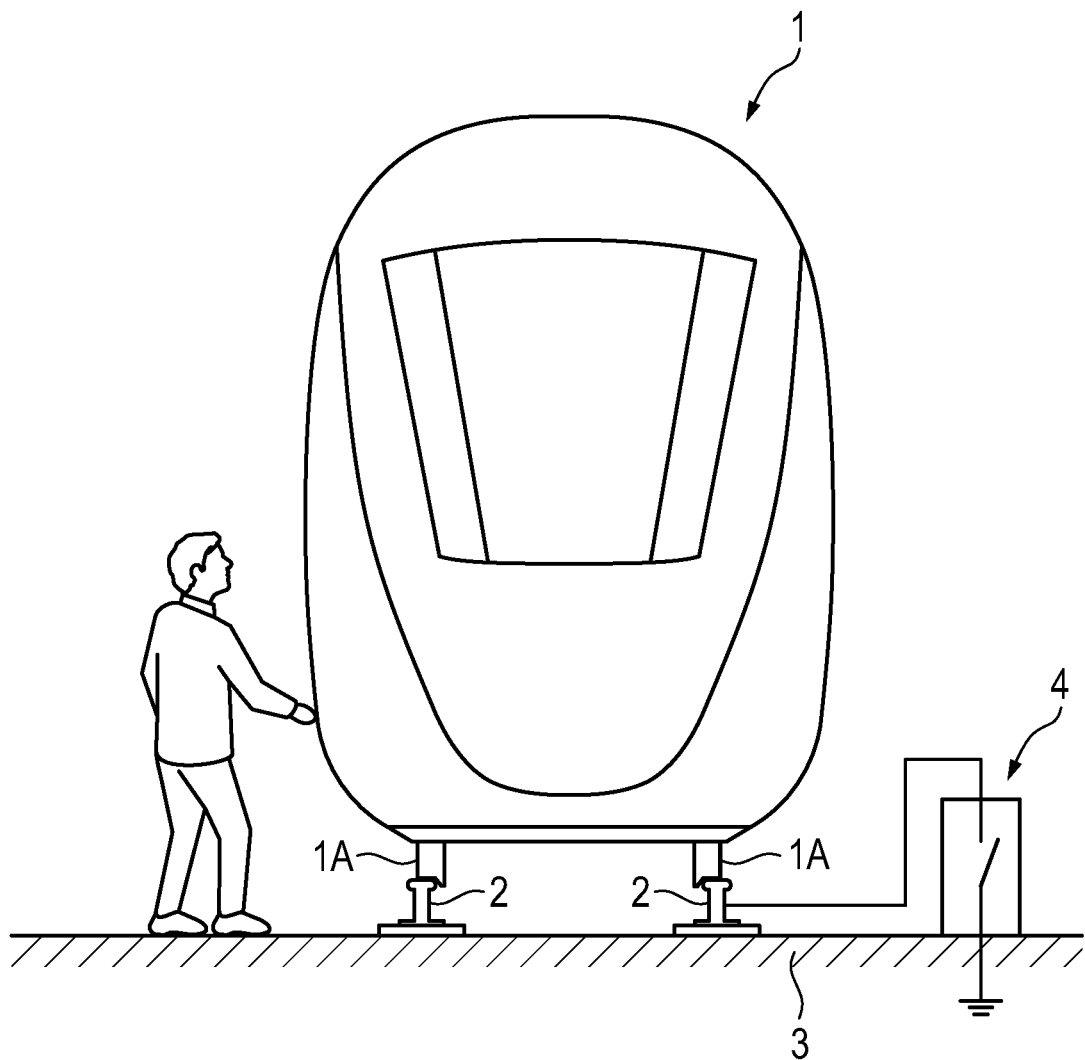

contact surface which extends in the direction of current flow. Electrodynamic forces act on the fixed conductors and the movable conductor, which are directed in such a way that the conductors attract each other, i.e., the switching contacts tend to close.

15 Claims, 7 Drawing Sheets

(58) Field of Classification Search
 CPC .......... H01H 2071/08; H01H 2071/24; H01H 2071/665; H01H 2205/002; H01H 2221/048; H01H 71/00; H01H 71/02; H01H 71/0207; H01H 71/08; H01H 71/10; H01H 71/1009; H01H 71/1045; H01H 71/24; H01H 71/2436; H01H 71/2454; H01H 71/26; H01H 71/66; H01H 71/68; H01H 71/685; H01H 71/7463; H01H 73/36; H01H 73/44; H01H 79/00; H01H 1/00; H01H 1/12; H01H 1/14; H01H 1/20; H01H 1/2025; H01H 1/22; H01H 1/221; H01H 1/54; H01H 1/58; H01H 50/54; B61L 1/02; B61L 1/20; B61L 27/00; B60M 5/02; B60M 5/00
 USPC ........................................................ 200/238
 See application file for complete search history.

(56) References Cited

U.S. PATENT DOCUMENTS

| | | | | |
|---|---|---|---|---|
| 5,613,865 | A * | 3/1997 | Dullin | H01R 13/6273 |
| | | | | 439/353 |
| 11,417,488 | B2 * | 8/2022 | Beuchelt | H01H 50/021 |
| 2013/0021122 | A1 | 1/2013 | Uchida | |
| 2013/0342294 | A1 | 12/2013 | Aarskog | |
| 2015/0325397 | A1 * | 11/2015 | Larcher | H01H 71/0228 |
| | | | | 335/187 |
| 2020/0168408 | A1 | 5/2020 | Mori et al. | |
| 2020/0381203 | A1 | 12/2020 | Sakaguchi et al. | |
| 2022/0254592 | A1 * | 8/2022 | Beuchelt | B60M 5/02 |

FOREIGN PATENT DOCUMENTS

| | | |
|---|---|---|
| EP | 3287312 A1 | 2/2018 |
| FR | 3007888 A1 | 1/2015 |
| JP | 2011210732 A | 10/2011 |
| WO | 2014207111 A1 | 12/2014 |
| WO | 2019031588 A1 | 2/2019 |

OTHER PUBLICATIONS

International Search Report corresponding to related application Serial No. PCT/EP2020/070383.
European Patent Office Apr. 5, 2023 Office Action for corresponding patent application No. 19 188 422.0 including a Google Translation, 7 pages (not prior art).
U.S. Office Action of Feb. 1, 2024 in co-pending U.S. Appl. No. 17/625,303 (not prior art) (26 pages).

* cited by examiner

SWITCHING DEVICE AND VOLTAGE LIMITING DEVICE HAVING A SWITCHING DEVICE

The invention relates to a switching device, in particular for a voltage limiting device, having a first fixed switching contact which is electrically connected to a first device terminal, a second fixed switching contact which is electrically connected to a second device terminal, and a movable switching contact, wherein the movable switching contact is movable between a closed position in which the first and second fixed switching contacts are electrically connected to one another, and an open position in which the first and second fixed switching contacts are separated from one another. The invention also relates to a voltage limiting device which has such a switching device.

Voltage limiting devices (VLD) are used in the field of rail energy supply, in particular in the field of DC-powered railways. In the case of DC-powered railways, the rail is often used as a return conductor for the traction current, the rail being insulated from earth in order to prevent stray currents from occurring. Due to the electrical resistance of the rail, the return current flowing through the rail results in a potential difference with respect to the earth, which can be tapped as a voltage between rail and earth. Voltage limiting devices are prescribed to avoid impermissible contact voltages that can occur during operation or in the event of a fault. The voltage limiting device is an automatically resettable earthing short-circuiter, which is generally installed between the rail and the earthing system and which responds at a defined threshold value for the contact voltage.

The known voltage limiting devices have a switching device that creates an electrical connection between two cable terminals. Depending on the design, the switching devices have a single-pole or multi-pole contactor with a fixed and a movable switching contact actuated by an actuation unit. The switching device can also comprise a thyristor connected in parallel.

In the known contactors, the contact surfaces of the fixed switching contact and the movable switching contact are generally opposite one another. An immovable conductor connects the fixed switching contact to a first device terminal and a movable conductor connects the movable switching contact to a second device terminal. With these arrangements of switching contacts and conductors, which are designed for frequent switching, electrodynamic forces occur which act on the switching contacts. These forces are directed in such a way that the switching contacts tend to be opened.

In certain applications, the contactor must be able to switch very often and/or very quickly and also switch on high currents and conduct them for a certain time. If the current strength becomes too high, technical measures must be taken to prevent the contactor from being destroyed when it is switched on.

A known technical measure in voltage limiting devices is to operate the contactor together with thyristors, which are triggered as a function of the switching of the contactor. The thyristors can switch in a few microseconds, while the contactor has a closing time that can be between 100 and 200 ms. After the thyristors have been triggered, the contactor can take over the load. A control device is provided to control the contactor or the thyristors. All components are usually located in a control cabinet.

The invention is based on the object of creating a switching device which allows higher switching capacities when switched on and the brief carrying of a high current. Another object of the invention is to create a voltage limiting device which allows higher switching capacities when switching on and the brief carrying of a high current.

According to the invention, these objects are achieved by the features of the independent claims. The subject matter of the dependent claims relates to advantageous embodiments of the invention.

The switching device according to the invention is characterised by a special arrangement and design of the switching contacts which, when high currents flow, lead to the occurrence of electrodynamic forces which are directed in such a way that the switching contacts attract each other.

The switching device according to the invention has a first and a second fixed switching contact and a movable switching contact. When a switching contact, in particular a first and a second switching contact, is mentioned below, this does not mean that only one switching contact has to be provided. Rather, the switching device according to the invention can also have a plurality of fixed or movable switching contacts. For example, the switching device can comprise a plurality of assemblies, each of which has a first and a second fixed switching contact and a movable switching contact. These assemblies can be operated separately in order to switch a plurality of currents, or the modules can be connected in parallel.

The first and second fixed switching contacts are arranged in such a way that their contact surfaces point in the same direction. The movable switching contact can be moved between a closed position, in which the first and second fixed switching contacts are electrically connected to one another, and an open position, in which the first and second fixed switching contacts are separated from one another. The first and second fixed switching contact and the movable switching contact form an arrangement of electrical conductors which are arranged substantially parallel to one another.

In this arrangement of switching contacts, it is of particular importance that the contact surface of at least one of the fixed switching contacts is an elongated contact surface which extends in the direction of current flow. The contact surfaces of the two fixed switching contacts are preferably elongated contact surfaces. In this context, an elongated contact surface is understood to mean a contact surface which, in the direction of current flow, has a length that is in any case greater than the width of the contact surface. The contact surface should be as long as possible in relation to its width. The direction of current flow is defined as the direction in which the current flows from one fixed switching contact via the movable switching contact to the other fixed switching contact. Consequently, the arrangement of switching contacts forms an elongated conductor arrangement.

The switching device is thus designed or can thus be operated in such a way that rectified currents flow through the fixed switching contacts and the movable switching contact, which makes contact with the fixed switching contacts. The current flow has the effect that electrodynamic forces act on the fixed conductors and the movable conductors, which are directed in such a way that the conductors attract each other, i.e., the switching contacts tend to close. It has been found that, in this way, the forces acting on the conductive parts of the switching device, in particular the switching contacts thereof, are reduced and the switching contacts are relieved. This improves the electrical properties of the switching device. The switching device can switch higher loads without the contacts of the switching device having to be reinforced or other technical measures being taken. This effect increases with the length of the contact surface.

The special arrangement and design of the switching contacts distinguishes the switching device according to the invention from the arrangement and design of the switching contacts of commercially available switching devices, the switching contacts or contact surfaces of which are usually punctiform, square or rectangular, wherein the rectangular contacts are wide and short in the direction of current flow.

The first and second fixed switching contact and the movable switching contact can basically be designed as desired, i.e., have any cross section and any length, as long as the switching contacts form an arrangement of substantially parallel conductors through which rectified currents flow, which conductors attract each other. The strength of the electrodynamic forces depends on the current strength.

A preferred embodiment of the switching device provides that the first and second fixed switching contacts are straight electrical conductors which preferably have a rectangular cross section. The switching contacts can also have an elliptical or round cross section, for example. In the case of a rectangular cross section, it is advantageous if the first and second fixed switching contacts are arranged in such a way that their broad sides form the contact surfaces. The fixed switching contacts are therefore preferably short flat rails. The movable switching contact is likewise preferably a straight electrical conductor which has a rectangular cross section, the broad side of which preferably forms the contact surface. Consequently, the switching contacts are opposite one another with the broad sides.

The region in which the movable switching contact and the fixed switching contact are opposite one another should be as long as possible in relation to the direction of current flow, so that the resulting electrodynamic forces become high. This is achieved in particular when the length of the movable switching contact is greater than or equal to the sum of the lengths of the first and second fixed switching contact and the distance between the first and second fixed switching contact. As a result, the movable switching contact extends over the entire available length of the fixed contacts.

In a further preferred embodiment, the movable switching contact is pivotable between the closed position and the open position about an axis which runs parallel to the longitudinal axes of the first and second fixed switching contact. However, the movable switching contact can also exercise a movement other than a rotary movement, for example a linear movement.

The actuation of the movable switching contact can take place with an actuation unit, which can be designed differently. The actuation unit can for example be an electromagnetic actuation unit.

The voltage limiting device according to the invention comprises the switching device according to the invention for producing an electrical connection between a first cable terminal and a second cable terminal, wherein a first electrical conductor electrically connects the first cable terminal to the first device terminal (terminal surface) of the switching device and a second electrical conductor electrically connects the second cable terminal to the second device terminal (terminal surface) of the switching device. The two electrical conductors may each have a plurality of conductive parts. Further electrical components can also be provided in the respective current path. The voltage limiting device is characterised in that a conductor portion of the first or second electrical conductor is arranged in a substantially parallel alignment with the smallest possible distance to the movable switching contact upstream of the movable switching contact in a region in which the movable switching contact moves away from the conductor portion in case of a movement from the open position into the closed position. The voltage limiting device is thus designed or can thus be operated in such a way that the movable switching contact and a conductor portion of the first or second conductor form an arrangement of parallel conductors through which counter currents flow. The current flow leads to electrodynamic forces acting on the movable switching contact and the fixed conductor (current path), which electrodynamic forces are directed in such a way that the conductors repel one another. Since the conductor portion of the first or second conductor is arranged upstream of the movable conductor in such a way that the movable switching contact moves away from the conductor portion when it moves from the open position to the closed position, the switching contacts tend to close. It has been shown that this reduces the forces to be applied by the switching device to close the switching contact and relieves the load on the conductive parts (switching contacts). This improves the electrical properties of the voltage limiting device. The voltage limiting device can switch higher loads without having to reinforce the conductive parts or take other technical measures. This effect reinforces the effect described above, which is due to the special arrangement of the fixed conductor and the movable conductor.

In a preferred embodiment, in the closed position, the conductor portion of the first or second electrical conductor arranged upstream of the movable switching contact in a substantially parallel alignment to the movable switching contact and the movable switching contact lie in one plane. However, the conductor portion of the first or second conductor and the movable switching contact do not need to be precisely aligned with one another, i.e., the conductors can also lie in planes that are slightly offset from one another.

The conductor portion arranged upstream of the movable switching contact in a parallel alignment to the movable switching contact can in principle have any design, i.e., have any cross section and any length, as long as this conductor portion and the movable switching contact form an arrangement of parallel conductors through which counter currents flow which repel one another. The strength of the electrodynamic forces depends on the current strength, on which the dimensioning of the conductors also depends.

In a preferred embodiment, the conductor portion of the first or second electrical conductor arranged upstream of the movable switching contact in a substantially parallel alignment to the movable switching contact is a straight electrical conductor portion which preferably has a rectangular cross section. The conductor portion is preferably arranged in such a way that its broad side faces the movable switching contact.

The direction of the current flow through the first or second conductor is dependent on the potential which is applied to the first or second cable terminal, i.e., whether the first or second cable terminal is at ground potential, for example.

The conductor portion of the first or second electrical conductor arranged upstream of the movable switching contact in a substantially parallel alignment to the movable switching contact has a first end portion facing the first fixed switching contact and a second end portion facing the second fixed switching contact.

One embodiment provides that the first electrical conductor has a conductor portion which extends from the first cable terminal to the second end portion of the conductor portion of the first electrical conductor arranged upstream of the movable switching contact in a parallel alignment to the movable switching contact, and the first electrical conductor has a conductor portion which extends from the first end portion of the conductor portion of the first electrical conductor, which is arranged upstream of the movable switching contact in a parallel alignment to the movable switching contact, to the first device terminal of the switching device. In this embodiment, the second electrical conductor extends from the second device terminal to the second cable terminal.

In an alternative embodiment, the first electrical conductor extends from the first cable terminal to the first device terminal. The second electrical conductor has a conductor portion which extends from the second device terminal to the second end portion of the conductor portion of the second electrical conductor arranged upstream of the movable switching contact in a parallel alignment to the movable switching contact, and the second electrical conductor has a conductor portion, which extends from the first end portion of the conductor portion of the second electrical conductor, which is arranged upstream of the movable switching contact in a parallel alignment to the movable switching contact, to the second cable terminal.

In both embodiments, the conductor portion of the first or second conductor and the movable switching contact are traversed by currents which flow in different directions.

In addition to the above embodiments, however, other embodiments are also possible in which the first and second conductors are connected in such a way that the current flows from the second fixed switching contact via the movable switching contact to the first fixed switching contact.

The voltage limiting device can be arranged in a conventional control cabinet which may have a front and a back, a left-side part and right-side part and a top part and a bottom part. The control cabinet can also accommodate other components of a voltage limiting device known from the prior art, for example a control unit for the actuation unit.

The switching device according to the invention may be not only a DC switching device, but also an AC switching device, wherein the above effects occur during the positive or negative half-cycle of the AC voltage.

Figure 2:
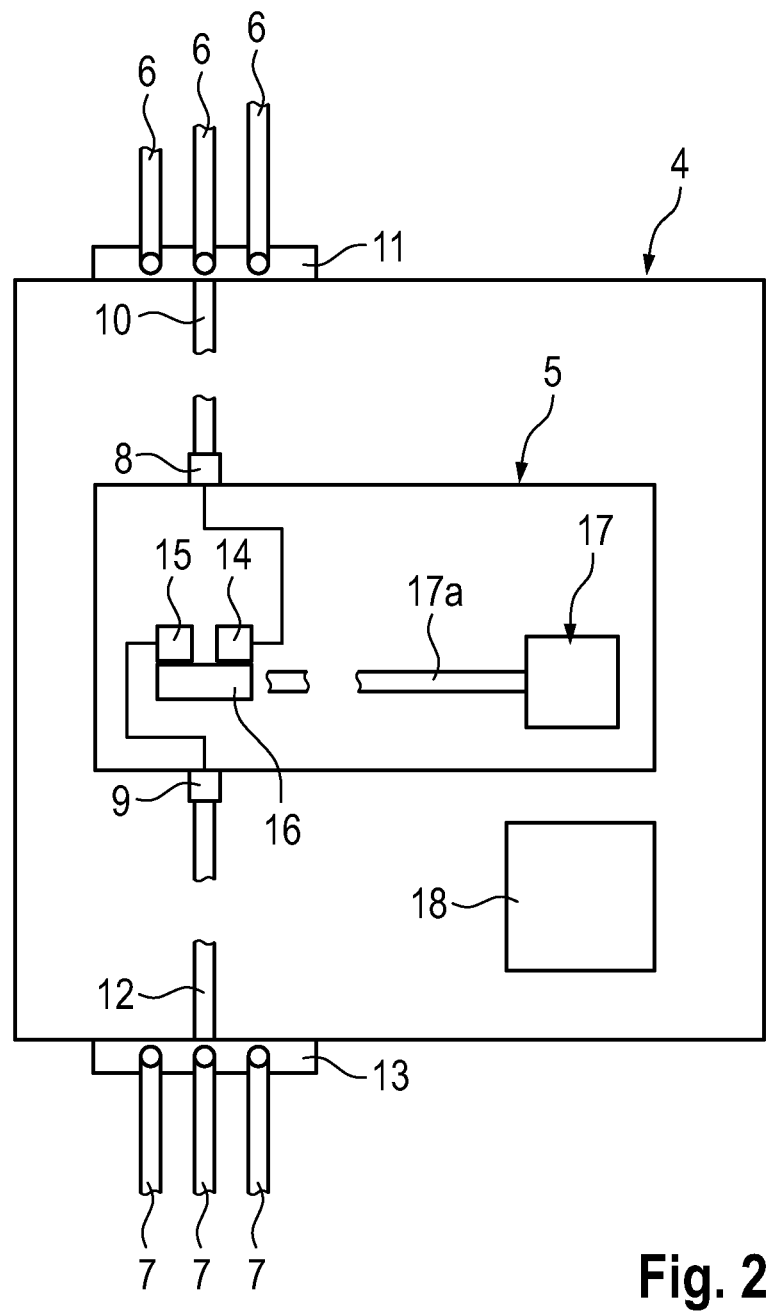
Figure 3:
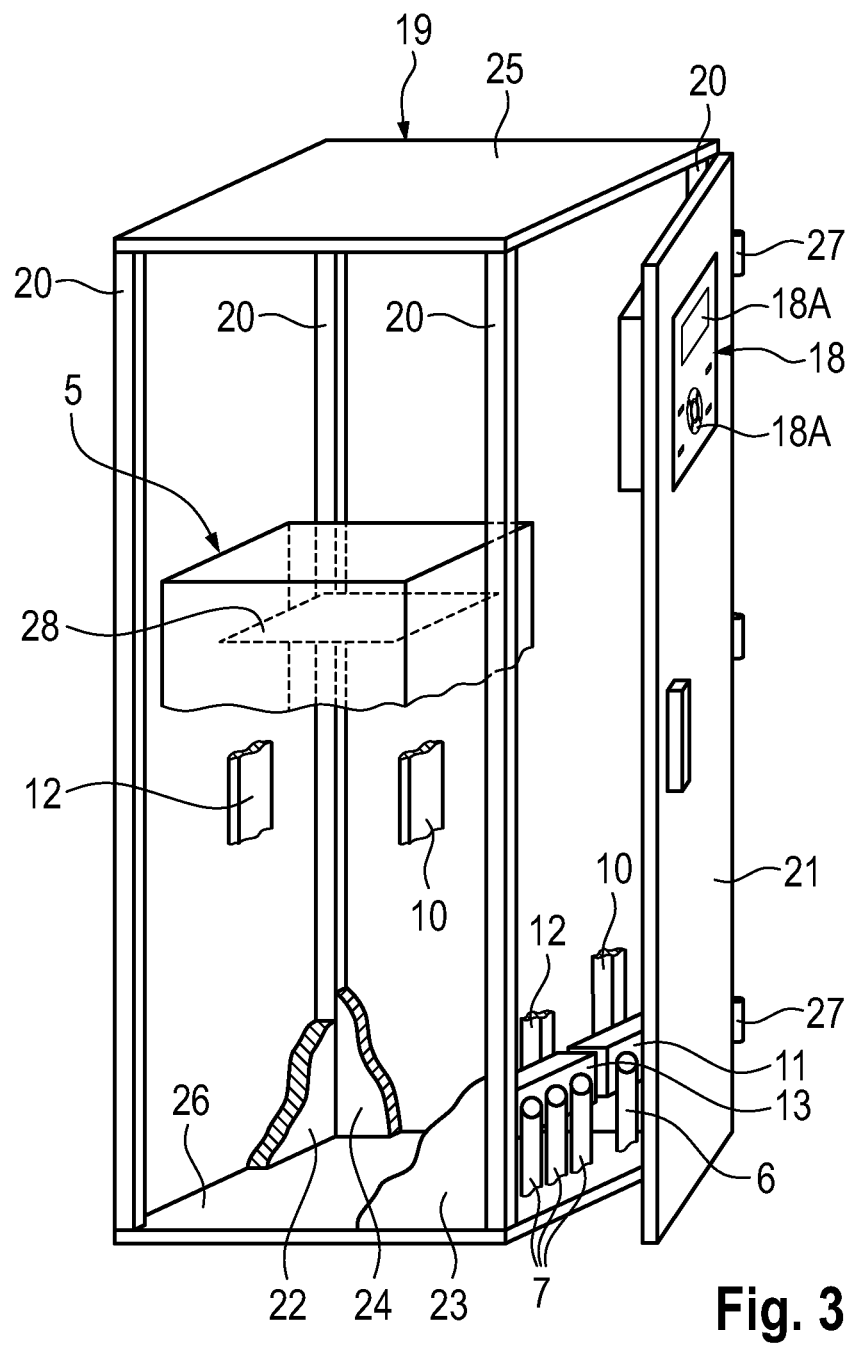

Embodiments of the invention are explained in detail below with reference to the drawings, in which:

FIG. 1 is a highly simplified schematic representation of a rail vehicle and a voltage limiting device, FIG. 2 is a highly simplified schematic representation of the substantial components of the voltage limiting device that has the switching device according to the invention, FIG. 3 shows a control cabinet with the voltage limiting device.

Figure 4:
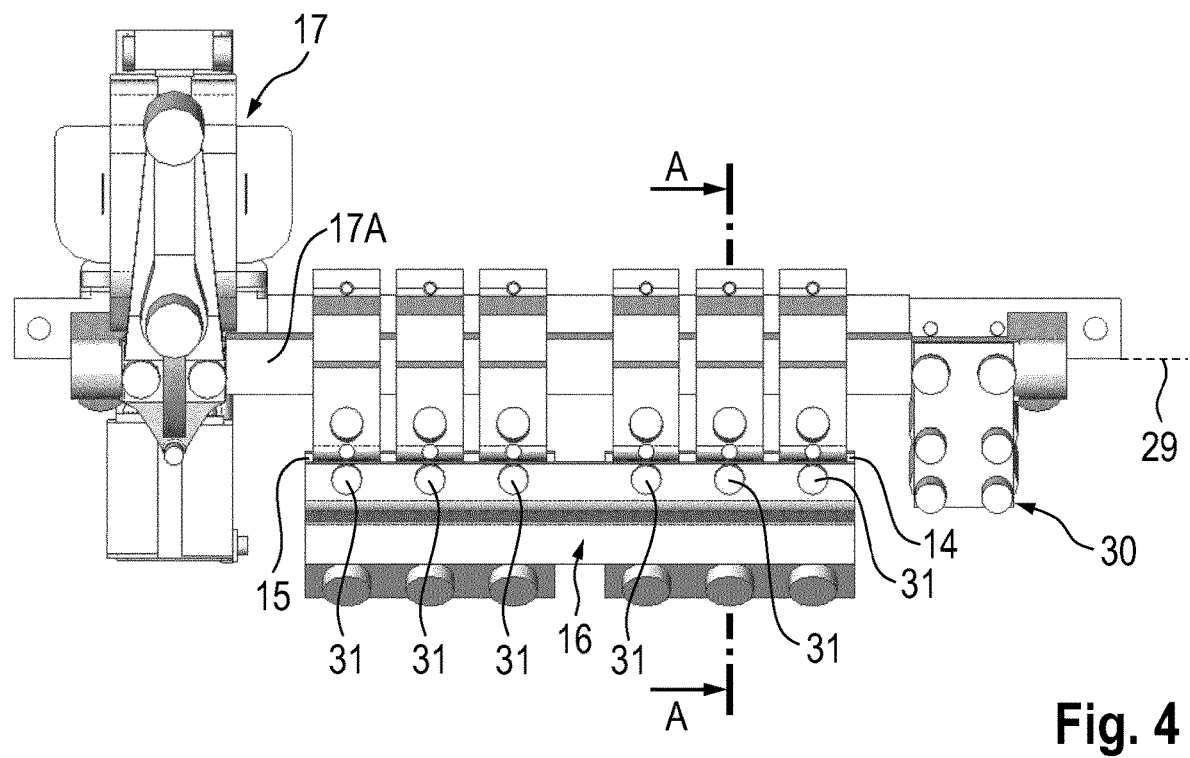
Figure 5:
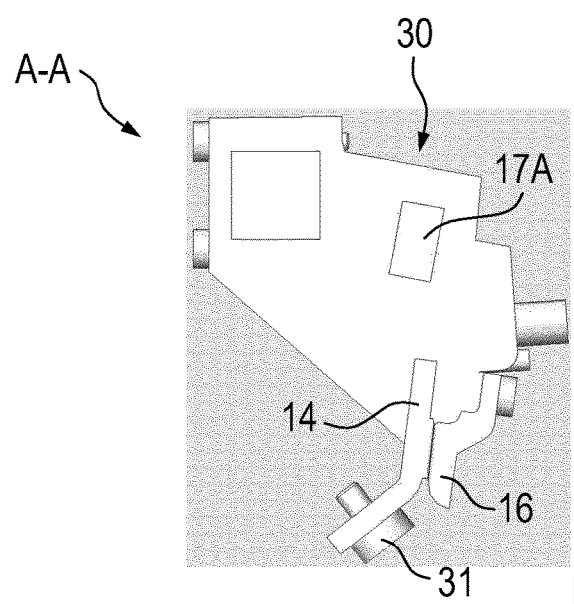
Figure 6:
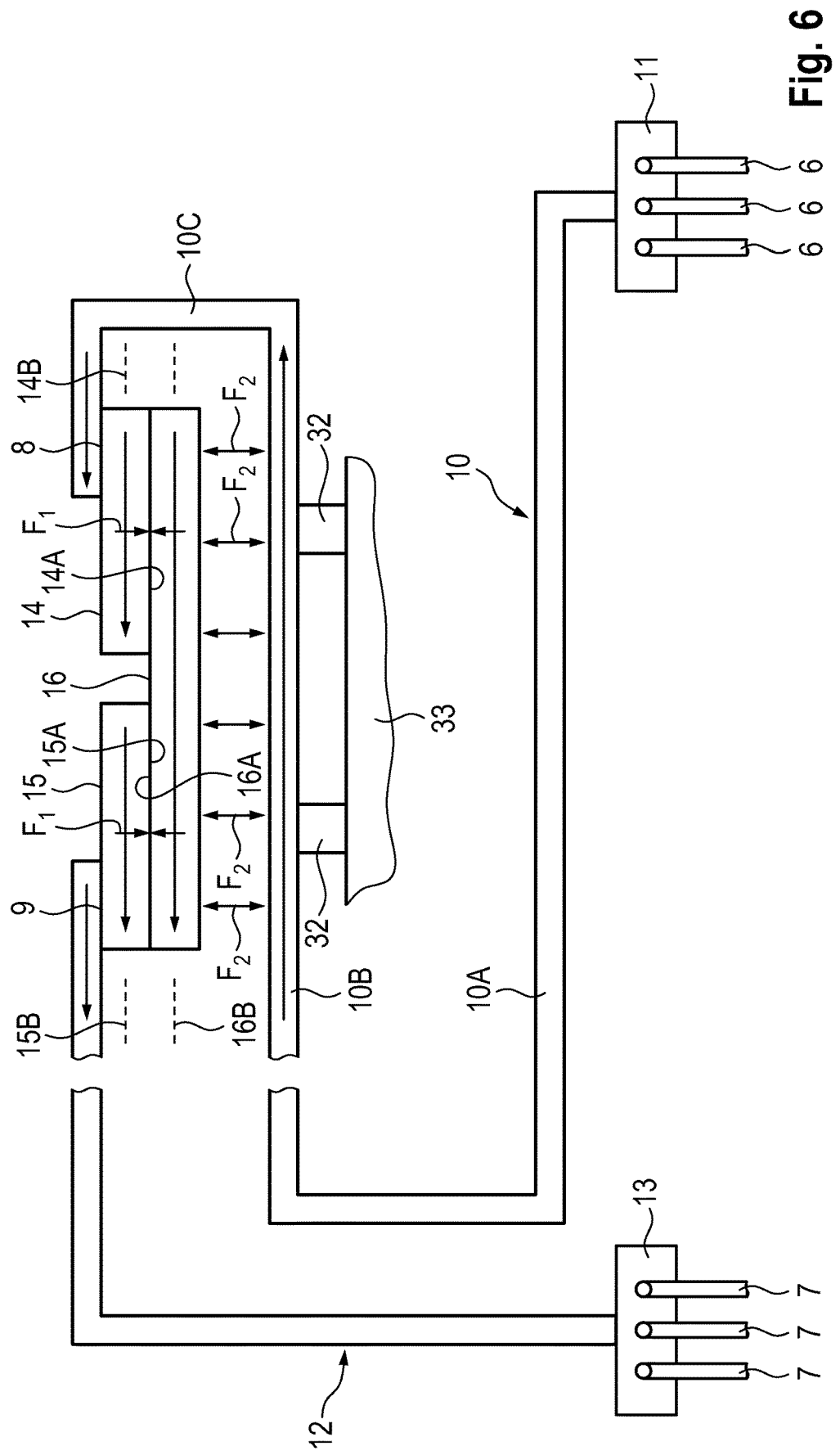
Figure 7:
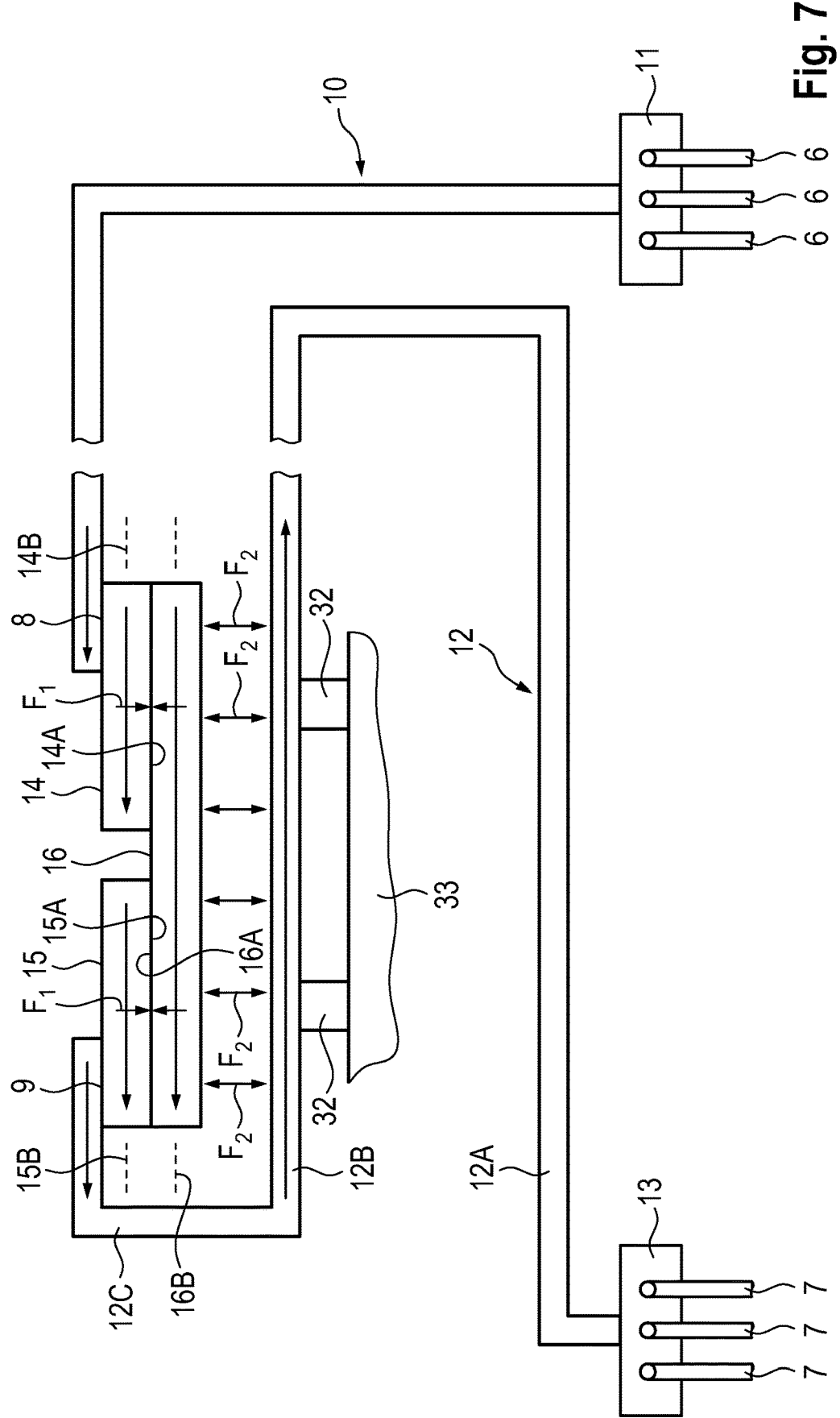
Figure 8:
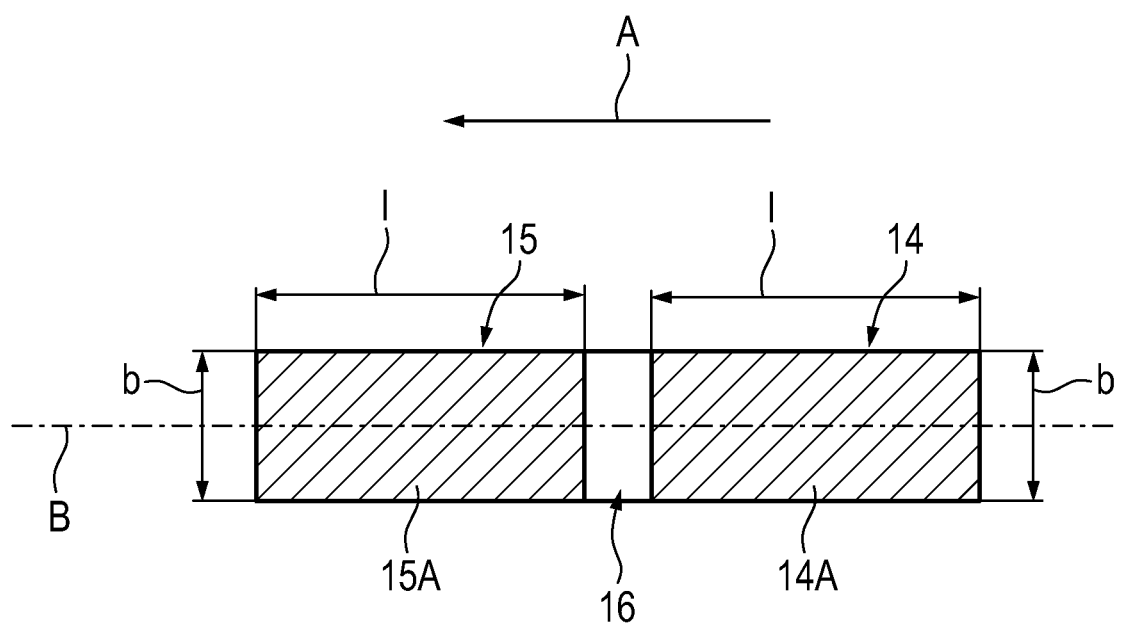

FIG. 4 is an embodiment of the switching device with the fixed switching contacts and the movable switching contact as well as the actuation unit in a top view, FIG. 5 is a section on line A-A in FIG. 4, FIG. 6 is a schematic representation of the arrangement of the fixed switching contacts and the movable switching contact of the switching device as well as the conductors leading to the device terminals of the switching device, FIG. 7 is a schematic representation of an alternative embodiment of the arrangement of the fixed switching contacts and the movable switching contact of the switching device and the conductors leading to the device terminals of the switching device, and FIG. 8 is a highly simplified schematic representation of the switching contacts according to the invention, FIG. 1 shows a DC-powered rail vehicle together with a voltage limiting device. The rail vehicle 1 has wheels 1A, which run on a rail 2. The rail 2 of the railway system is insulated from earth 3. The electrical resistance of the rail 2 results in the occurrence of a potential difference between the rail vehicle 1 or the rail 2 and earth 3. The voltage limiting device 4 prevents the occurrence of impermissible contact voltages during normal railway operation or in the event of a fault (short circuit). The voltage limiting device 4 is installed between the rail 2 and the earthing system and can establish an electrical connection between the rail 2 and earth 3 (earthing short-circuiter).

FIG. 2 shows the substantial components of the voltage limiting device 4 according to the invention in a highly simplified schematic representation. The voltage limiting device 4 comprises the switching device 5 according to the invention in order to establish an electrical connection between one or more cables 6 that lead to a component or assembly of the rail energy supply system (not shown), for example a track, and one or more cables 7 that are connected to an earthing system (not shown) or can be connected to another track. In the present embodiment, the switching device is a DC switching device.

The switching device 5 according to the invention has a first device terminal 8 and a second device terminal 9. The first device terminal 8 is electrically connected to a first cable terminal 11 with a first electrical conductor 10, and the second device terminal 9 is electrically connected to a second cable terminal 13 with a second electrical conductor 12. One or a plurality of cables 6, which for example lead to a track, can be connected to the first cable terminal 11, and one or a plurality of cables 7 can be connected to the second cable terminal 13, which are connected to an earthing system, for example.

The switching device 5 has an electromagnetic actuation unit 17, which can comprise a coil and a magnet armature, in order to actuate a shaft 17A with which the movable switching contact 16 is opened or closed. The switching device can also have other components, for example a so-called spark chimney, which belong to the prior art. The actuation unit 17 may also be referred to as an acutator 17.

The switching device 5 has an electromagnetic actuation unit 17, which can comprise a coil and a magnet armature, in order to actuate a shaft 17A with which the movable switching contact 16 is opened or closed. The switching device can also have other components, for example a so-called spark chimney, which belong to the prior art.

In addition, the voltage limiting device 4 has an operating and control unit 18. The components of the voltage limiting device are located in a control cabinet.

FIG. 3 shows a view of the control cabinet 19 in a simplified perspective representation. In the position shown in FIG. 3, the control cabinet 19 has four vertical profile bars 20 to which a front part 21, a rear part 22, a left-side part 23, a right-side part 24, a top part 25 and a bottom part 26 are fastened. The front part 21 is a pivotable door which is fastened to side hinges 27 on the right side of the control cabinet 19.

The operating and control unit 18 is located in the upper half of the door of the control cabinet 19, so that the operating elements 18A are accessible from the outside. The switching device 5 is located inside the control cabinet 19. In FIG. 3, the switching device 5 is shown only schematically. The first and second cable terminals 11 and 13 are located in the lower half of the control cabinet 19. The conductors 10, 12 leading to the switching device 5 are only indicated in outline.

The special arrangement and design of the switching contacts is described below with reference to FIGS. 4 to 8. FIGS. 4 and 5 show the components of the switching device substantial for the invention in detail, wherein FIG. 5 is a section along the line A-A. FIGS. 6 and 7 are simplified schematic representations and FIG. 8 is a schematic diagram. In FIGS. 4 to 8, the parts corresponding to one another are provided with the same reference numerals as in FIG. 2.

In the present embodiment, the switching device 5 has two fixed switching contacts 14, 15 and one movable switching contact 16. In the present embodiment, the switching contacts 14 to 16 have a substantially rectangular cross section. A rectangular cross section may be described as including two narrow sides and two broad sides. The fixed switching contacts 14, 15 are flat rails made of a conductive material, for example copper, which are arranged at a distance from one another. The contact surfaces 14A, 15A, which are located on the broad sides of the fixed switching contacts, point in one direction. The movable switching contact 16 is also a flat rail made of a conductive material, for example copper, which has a substantially rectangular cross section. The contact surface 16A of the movable switching contact 16 is located on its broad side. The movable switching contact 16 is arranged in relation to the first and second fixed switching contacts 14, 15 in such a way that its contact surface 16A faces the contact surfaces 14A, 15A of the first and second fixed switching contacts 14, 15. The movable switching contact 16 has the same length as the sum of the lengths of the fixed switching contacts 14, 15 and the distance between the fixed switching contacts. The longitudinal axes 14B, 15B of the fixed switching contacts 14, 15 and the longitudinal axis 16B of the movable switching contact 16 are parallel. The switching contacts 14 to 16 are in the same plane or at the same height.

In the present embodiment, the switching device 5 is arranged in the control cabinet 19 in such a way that the switching contacts 14 to 16 lie in a substantially horizontal plane 28 in relation to the control cabinet, i.e., are substantially at the same height in the control cabinet, wherein the fixed switching contacts 14, 15 facing the rear part 22 of the control cabinet and the movable switching contact 16 face the front part 21 of the control cabinet (FIG. 3). The switching contacts can also be arranged in a vertical plane.

FIGS. 4 and 5 show the fixed switching contacts 14, 15 lying next to one another and the movable switching contact 16 arranged upstream of the fixed switching contacts in the present view in detail. The movable switching contact 16 is pivotable about a horizontal axis 29, so that the movable switching contact can be moved between a closed position, in which the first and second fixed switching contacts 14, 15 are electrically connected to one another, and an open position, in which the first and second fixed switching contact are separated from one another.

The movable switching contact 16 is actuated by the actuation unit 17, which is arranged next to the switching contacts 14 to 16, for example on the left side. On the other side of the switching contacts, a mechanism 30 is located in order to resiliently bias the movable switching contact 16 onto the fixed switching contacts 14, 15. For the sake of clarity, the electrical connections to the device terminals 8, 9 and parts of the mechanics are not shown. On the switching contacts 14 to 16, parts for fastening the contacts can also be provided, which can be an integral part of the contacts. The movable switching contact 16 is screwed, for example by means of screws 31, to fastening elements (not shown in detail), which in turn are connected to the shaft 17A of the actuation unit 17.

The first fixed switching contact 14 is connected to the first conductor 10 and the second fixed switching contact 15 is connected to the second conductor 12 (FIGS. 2 and 6). In the present embodiment, the first and second conductors 10, 12 are flat rails made of a conductive material such as copper. The conductors 10, 12 are connected to terminal surfaces 8, 9, which can be provided on the side of the fixed switching contacts 14, 15 opposite the contact surfaces 14A, 15A. This region represents the device terminal 8, 9 of the switching device 5.

It is assumed below that a current flows from the first cable terminal 11 to the second cable terminal 13 during the operation of the switching device 5. The longitudinal axes 14B, 15B of the fixed switching contacts 14, 15 and the longitudinal axis 16B of the movable switching contact 16 are parallel. Due to the current flow, which is indicated by arrows, electrodynamic forces act on the switching contacts 14 to 16. Since rectified currents flow through the fixed switching contacts 14, 15 and the movable switching contact 16, forces $F_1$ act on the switching contacts, which are directed in such a way that the switching contacts attract each other. The forces $F_1$ are indicated by arrows in FIG. 6. As a result of the current flow, greater forces $F_1$ act on the switching contacts, which lead to the contact force becoming greater or the forces required to close the switch becoming smaller. This relieves the load on the electrically conductive components. As a result, the switching device can switch and conduct higher currents with the same dimensions as a conventional switching device.

FIG. 8 shows a highly simplified schematic representation of the switching contacts 14, 15, 16 in plan view. In the present representation, the first and second fixed switching contacts 14, 15 are arranged above the movable switching contact 16. The current flows from the first fixed switching contact 14 via the movable switching contact 16 to the second fixed switching contact 15. The direction of current flow is denoted by A. The longitudinal axes of the switching contacts 14, 15, 16 are denoted by B. The region in which the contact surface 14A or 15B of the respective fixed switching contact 14, 15 touches the contact surface 16A of the movable switching contact 16, i.e., the effective contact surface, is marked with hatching. It can be seen that the contact surfaces or the effective contact regions extend in the direction A of current flow, i.e., have a length l which is greater than the width b. The contact surfaces are longer, preferably much longer, than they are wide. In an embodiment the length l is at least twice as long as the width b of the contact surface 14A or 15A.

Another aspect of the invention is described below, which relates to the particular arrangement and design of the first or second conductor 10, 12. FIG. 6 shows an embodiment in which a conductor portion 10B of the first conductor 10 is arranged in a parallel alignment to the movable switching contact 16 in a region upstream of the movable switching contact 16 in such a way that the movable switching contact moves from the open position to the closed position shown in FIG. 6 away from the parallel conductor portion 10B of the first conductor 10.

In the present embodiment, the parallel conductor portion 10B of the first conductor 10 is arranged in the same horizontal plane 28 as the switching contacts 14 to 16 of the switching device. The parallel conductor portion 10B, which preferably has a rectangular cross section, can be a flat rail made of a conductive material, for example copper. The conductor portion 10B and the movable switching contact 16 are opposite one another with the broad sides. An exact parallel alignment of the broad sides (surfaces) is advantageous but not necessary. The flat conductors can also be slightly tilted towards one another. The conductor portion 10B should have a length which is at least as long as the length of the movable switching contact 16. The conductor portion 10B is firmly connected by means of insulators 32 to supports 33 which can be fastened to the post 20 or other parts of the control cabinet 19. The fastening of the remaining conductor portions of the first conductor 10 and the fastening of the second conductor 12 are not shown.

The first conductor 10 has a conductor portion 10A which electrically connects the first cable terminal 11 to the end portion of the parallel conductor portion 10B of the first conductor, which is on the side of the second fixed switching contact 15, and the first conductor 10 has a conductor portion 10C which electrically connects the end portion of the parallel conductor portion 10B of the first conductor 10, which lies on the side of the first fixed switching contact 14, to the first device terminal or the first switching contact 14. The second conductor 12 connects the second switching contact 15 to the second cable terminal 13. The currents in the parallel conductor portion 10B of the first conductor 10 and in the movable switching contact 16 thus flow in an opposite direction. In the event of a current flow, the fixed conductor portion 10B, which extends in parallel, and the movable switching contact 16 consequently repel one another. As a result, a pressure force $F_2$ is exerted on the movable switching contact 16, so that the contact force is increased and the lifting of the contacts when switching is minimised. In this embodiment the parallel conductor portion 10B may be referred to as an intermediate portion 10B of the first conductor 10. The conductor portion 10A may be referred to as an upstream portion 10A of the first conductor 10. The conductor portion 10C may be referred to as a downstream portion 10C of the first conductor 10.

FIG. 7 shows an alternative embodiment which differs from the embodiment of FIG. 6 only in the connection of the first and second conductors 10, 12 to the cable terminals 11, 13. Like parts are identified by the same reference numerals. In the alternative embodiment, it is not the first conductor 10 but rather the second conductor 12 that has a conductor portion 12B that extends parallel to the movable switching contact 16. The second conductor 12 has a conductor portion 12A, which electrically connects the second cable terminal 13 to the end portion of the parallel conductor portion 12B of the second conductor 12, which is on the side of the first fixed switching contact 14, and the second conductor 12 has a conductor portion 12C which electrically connects the end portion of the parallel conductor portion 12B, which is on the side of the second fixed switching contact 15, to the second device terminal 9 or the second switching contact 15. The currents in the parallel conductor portion 12B and in the movable switching contact 16 also flow in the opposite direction in this arrangement. As a result, the parallel conductor portion 12B and the movable switching contact 16 repel one another. In this embodiment the parallel conductor portion 12B may be referred to as an intermediate portion 12B of the second conductor 12. The conductor portion 12C may be referred to as an upstream portion 12C of the second conductor 12. The conductor portion 12A may be referred to as a downstream portion 12A of the second conductor 12.

In addition to the above embodiments, other embodiments are also possible in which the first and second conductors 10, 12 are connected in such a way that the direction of current flow is reversed, i.e., the current from the second fixed switching contact 15 flows via the movable switching contact 16 to the first fixed switching contact 14.

The first conductor may have a conductor portion that electrically connects the first cable terminal to the end portion of the parallel conductor portion of the first conductor, which is on the side of the first fixed switching contact, and the first conductor may have a conductor portion that electrically connects the end portion of the parallel conductor portion of the first conductor, which is on the side of the second fixed switching contact, to the second device terminal or the second switching contact. The second conductor may connect the first fixed switching contact to the second cable terminal. The currents in the parallel conductor portion of the first conductor and in the movable switching contact thus flow in an opposite direction. Consequently, the parallel conductor portion and the movable switching contact repel one another when a current flows.

The first conductor may also connect the first cable terminal to the second fixed switching contact, wherein the second conductor has a conductor portion which electrically connects the second cable terminal to the end portion of the parallel conductor portion of the second conductor that is on the side of the second fixed switching contact, and the second conductor may have a conductor portion which connects the end portion of the parallel conductor portion of the second conductor, which lies on the side of the first fixed switching contact, to the first fixed switching contact.

The invention claimed is:

1. A switching device for a voltage limiting device, comprising:
   a first fixed switching contact electrically connected to a first device terminal, the first fixed switching contact including a first fixed switching contact surface;
   a second fixed switching contact electrically connected to a second device terminal, the second fixed switching contact including a second fixed switching contact surface;
   a movable switching contact movable between a closed position in which the first and second fixed switching contacts are electrically connected to one another, and an open position in which the first and second fixed switching contacts are electrically separated from one another, the movable switching contact including a movable switching contact surface;
   the first and second fixed switching contacts being arranged next to one another such that the first and second fixed switching contact surfaces face in the same direction;
   the movable switching contact being arranged relative to the first and second fixed switching contacts such that the movable switching contact surface faces the first and second fixed switching contact surfaces;
   the first and second fixed switching contacts and the movable switching contact being arranged substantially parallel to one another such that a direction of a current flowing through the first and second fixed switching contacts during operation of the switching device is the same direction as a direction of a current flowing through the movable switching contact during operation of the switching device; and
   the first and second fixed switching contact surfaces and the movable switching contact surface being elongated contact surfaces extending in the direction of current flow, the elongated contact surfaces each having a length in the direction of current flow and a width perpendicular to the length, the length being at least twice the width;

wherein the movable switching contact is a straight electrical conductor having a cross-section having two narrower sides and two broader sides; and
wherein the movable switching contact is arranged such that one of the broader sides forms the movable switching contact surface as a continuous flat surface engaging both of the first and second fixed switching contact surfaces.

2. The switching device of claim 1, further comprising:
an actuator configured to move the movable switching contact between the closed position and the open position.

3. The switching device of claim 1, wherein:
the length of the movable switching contact surface in the direction of current flow is greater than or equal to a sum of the length of the first fixed switching contact surface in the direction of current flow plus the length of the second fixed switching contact surface in the direction of current flow plus a distance between the first and second fixed switching contacts.

4. The switching device of claim 1, wherein:
the first and second fixed switching contacts are straight electrical conductors each having a cross-section having two narrower sides and two broader sides.

5. The switching device of claim 4, wherein:
the first and second fixed switching contacts are arranged such that one of their broader sides form the first and second fixed switching contact surfaces, respectively.

6. A voltage limiting device including the switching device of claim 1.

7. The voltage limiting device of claim 6, further comprising:
a first cable terminal;
a second cable terminal;
a first electrical conductor connecting the first cable terminal to the first device terminal of the switching device;
a second electrical conductor connecting the second cable terminal to the second device terminal of the switching device; and
wherein a parallel conductor portion of one of the first or second electrical conductors is arranged in a substantially parallel alignment to the movable switching contact in a region such that the movable switching contact is moved away from the parallel conductor portion upon movement from the open position to the closed position.

8. The voltage limiting device of claim 7, wherein:
in the closed position of the movable switching contact the parallel conductor portion and the movable switching contact lie in one plane.

9. The voltage limiting device of claim 7, wherein:
the parallel conductor portion is a straight conductor portion having a cross-section including two narrower sides and two broader sides, the narrower sides being shorter than the broader sides.

10. The voltage limiting device of claim 9, wherein:
the parallel conductor portion is arranged such that one of the broader sides faces the movable switching element.

11. The voltage limiting device of claim 7, wherein:
the voltage limiting device is arranged in a control cabinet.

12. A switching device for a voltage limiting device, comprising:
a first fixed switching contact electrically connected to a first device terminal, the first fixed switching contact including a first fixed switching contact surface;
a second fixed switching contact electrically connected to a second device terminal, the second fixed switching contact including a second fixed switching contact surface;
a movable switching contact movable between a closed position in which the first and second fixed switching contacts are electrically connected to one another, and an open position in which the first and second fixed switching contacts are electrically separated from one another, the movable switching contact including a movable switching contact surface;
the first and second fixed switching contacts being arranged next to one another such that the first and second fixed switching contact surfaces face in the same direction;
the movable switching contact being arranged relative to the first and second fixed switching contacts such that the movable switching contact surface faces the first and second fixed switching contact surfaces;
the first and second fixed switching contacts and the movable switching contact being arranged substantially parallel to one another such that a direction of a current flowing through the first and second fixed switching contacts during operation of the switching device is the same direction as a direction of a current flowing through the movable switching contact during operation of the switching device; and
the first and second fixed switching contact surfaces and the movable switching contact surface being elongated contact surfaces extending in the direction of current flow, the elongated contact surfaces each having a length in the direction of current flow and a width perpendicular to the length, the length being at least twice the width;
wherein the first and second fixed switching contacts are elongated along first and second longitudinal axes, respectively; and
wherein the movable switching contact is pivotable between the closed position and the open position about an axis parallel to the longitudinal axes of the first and second fixed switching contacts.

13. A voltage limiting device, comprising:
a switching device including:
a first fixed switching contact electrically connected to a first device terminal, the first fixed switching contact including a first fixed switching contact surface;
a second fixed switching contact electrically connected to a second device terminal, the second fixed switching contact including a second fixed switching contact surface;
a movable switching contact movable between a closed position in which the first and second fixed switching contacts are electrically connected to one another, and an open position in which the first and second fixed switching contacts are electrically separated from one another, the movable switching contact including a movable switching contact surface;
the first and second fixed switching contacts being arranged next to one another such that the first and second fixed switching contact surfaces face in the same direction;
the movable switching contact being arranged relative to the first and second fixed switching contacts such that the movable switching contact surface faces the first and second fixed switching contact surfaces;

the first and second fixed switching contacts and the movable switching contact being arranged substantially parallel to one another such that a direction of a current flowing through the first and second fixed switching contacts during operation of the switching device is the same direction as a direction of a current flowing through the movable switching contact during operation of the switching device; and the first and second fixed switching contact surfaces and the movable switching contact surface being elongated contact surfaces extending in the direction of current flow, the elongated contact surfaces each having a length in the direction of current flow and a width perpendicular to the length, the length being at least twice the width;

a first cable terminal;

a second cable terminal;

a first electrical conductor connecting the first cable terminal to the first device terminal of the switching device;

a second electrical conductor connecting the second cable terminal to the second device terminal of the switching device; and wherein a parallel conductor portion of one of the first or second electrical conductors is arranged in a substantially parallel alignment to the movable switching contact in a region such that the movable switching contact is moved away from the parallel conductor portion upon movement from the open position to the closed position;

wherein the parallel conductor portion is an intermediate portion of the first electrical conductor and includes a first end portion facing the first fixed switching contact and a second end portion facing the second fixed switching contact;

wherein the first electrical conductor further includes an upstream conductor portion extending from the first cable terminal to the second end portion of the intermediate conductor portion;

wherein the first electrical conductor further includes a downstream conductor portion extending from the first end portion of the intermediate conductor portion to the first device terminal of the switching device; and wherein the second electrical conductor extends from the second device terminal of the switching device to the second cable terminal.

14. A voltage limiting device, comprising:

a switching device including:

a first fixed switching contact electrically connected to a first device terminal, the first fixed switching contact including a first fixed switching contact surface;

a second fixed switching contact electrically connected to a second device terminal, the second fixed switching contact including a second fixed switching contact surface;

a movable switching contact movable between a closed position in which the first and second fixed switching contacts are electrically connected to one another, and an open position in which the first and second fixed switching contacts are electrically separated from one another, the movable switching contact including a movable switching contact surface;

the first and second fixed switching contacts being arranged next to one another such that the first and second fixed switching contact surfaces face in the same direction;

the movable switching contact being arranged relative to the first and second fixed switching contacts such that the movable switching contact surface faces the first and second fixed switching contact surfaces;

the first and second fixed switching contacts and the movable switching contact being arranged substantially parallel to one another such that a direction of a current flowing through the first and second fixed switching contacts during operation of the switching device is the same direction as a direction of a current flowing through the movable switching contact during operation of the switching device; and the first and second fixed switching contact surfaces and the movable switching contact surface being elongated contact surfaces extending in the direction of current flow, the elongated contact surfaces each having a length in the direction of current flow and a width perpendicular to the length, the length being at least twice the width;

a first cable terminal;

a second cable terminal;

a first electrical conductor connecting the first cable terminal to the first device terminal of the switching device;

a second electrical conductor connecting the second cable terminal to the second device terminal of the switching device; and wherein a parallel conductor portion of one of the first or second electrical conductors is arranged in a substantially parallel alignment to the movable switching contact in a region such that the movable switching contact is moved away from the parallel conductor portion upon movement from the open position to the closed position;

wherein the first electrical conductor extends from the first cable terminal to the first device terminal;

wherein the parallel conductor portion is an intermediate portion of the second electrical conductor and includes a first end portion facing the first fixed switching contact and a second end portion facing the second fixed switching contact;

wherein the second electrical conductor further includes an upstream conductor portion extending from the second device terminal to the second end portion of the intermediate conductor portion; and wherein the second electrical conductor further includes a downstream conductor portion extending from the first end portion of the intermediate conductor portion to the second cable terminal.

15. A voltage limiting device, comprising:

a switching device including:

a first fixed switching contact electrically connected to a first device terminal, the first fixed switching contact including a first fixed switching contact surface;

a second fixed switching contact electrically connected to a second device terminal, the second fixed switching contact including a second fixed switching contact surface;

a movable switching contact movable between a closed position in which the first and second fixed switching contacts are electrically connected to one another, and an open position in which the first and second fixed switching contacts are electrically separated from one another, the movable switching contact including a movable switching contact surface;

the first and second fixed switching contacts being arranged next to one another such that the first and second fixed switching contact surfaces face in the same direction;

the movable switching contact being arranged relative to the first and second fixed switching contacts such that the movable switching contact surface faces the first and second fixed switching contact surfaces;

the first and second fixed switching contacts and the movable switching contact being arranged substantially parallel to one another such that a direction of a current flowing through the first and second fixed switching contacts during operation of the switching device is the same direction as a direction of a current flowing through the movable switching contact during operation of the switching device; and the first and second fixed switching contact surfaces and the movable switching contact surface being elongated contact surfaces extending in the direction of current flow, the elongated contact surfaces each having a length in the direction of current flow and a width perpendicular to the length, the length being at least twice the width;

a first cable terminal;

a second cable terminal;

a first electrical conductor connecting the first cable terminal to the first device terminal of the switching device;

a second electrical conductor connecting the second cable terminal to the second device terminal of the switching device; and wherein a parallel conductor portion of one of the first or second electrical conductors is arranged in a substantially parallel alignment to the movable switching contact in a region such that the movable switching contact is moved away from the parallel conductor portion upon movement from the open position to the closed position; and wherein the parallel conductor portion of one of the first or second electrical conductors is arranged such that currents in the parallel conductor portion and the movable switching contact flow in opposite directions such that the parallel conductor portion and the movable switching contact repel one another.

\* \* \* \* \*